(12) United States Patent  (10) Patent No.: US 7,954,119 B2
Warn et al.  (45) Date of Patent: May 31, 2011

(54) APPARATUS FOR ATTACHING A DISK TO A SPINDLE OF A SPINSTAND, METHODS FOR ATTACHING AND DETACHING A DISK TO AND FROM A SPINDLE OF A SPINSTAND AND A MOVABLE STAGE

(75) Inventors: Ian Stanley Warn, Southampton (GB); Brett Robert Herdendorf, Mound, MN (US)

(73) Assignees: Xyratex Technology Limited, Havant (GB); Seagate Technology LLC, Scotts Valley, CA (US)

( * ) Notice: Subject to any disclaimer, the term of this patent is extended or adjusted under 35 U.S.C. 154(b) by 992 days.

(21) Appl. No.: 11/517,580

(22) Filed: Sep. 8, 2006

(65) Prior Publication Data

US 2008/0062855 A1  Mar. 13, 2008

(51) Int. Cl.
 *G11B 17/22* (2006.01)
 *G11B 5/455* (2006.01)
(52) U.S. Cl. ........... 720/703; 324/212; 369/258.1
(58) Field of Classification Search .......... 720/703, 720/706, 707; 369/258.1, 270.1; 324/212
See application file for complete search history.

(56) References Cited

U.S. PATENT DOCUMENTS

| | | | |
|---|---|---|---|
| 4,376,997 A * | 3/1983 | Eggers | 720/706 |
| 4,541,086 A * | 9/1985 | Tanaka | 720/711 |
| 5,048,005 A | 9/1991 | Ekhoff | |
| 5,056,082 A * | 10/1991 | Ekhoff | 720/707 |
| 5,644,564 A | 7/1997 | Peters | |
| 5,786,963 A | 7/1998 | Malek | |
| 5,828,519 A * | 10/1998 | Sasa | 360/99.12 |
| 6,531,867 B1 | 3/2003 | Greene | |
| 6,566,870 B2 | 5/2003 | Sorenson | |
| 2002/0145823 A1 | 10/2002 | Kilmer | |
| 2002/0181150 A1 | 12/2002 | Buske | |
| 2003/0103292 A1 | 6/2003 | Yeom | |
| 2004/0125488 A1 | 7/2004 | Zhu | |
| 2004/0244025 A1 * | 12/2004 | Horng et al. | 720/706 |
| 2007/0018640 A1 | 1/2007 | Guzik | |

FOREIGN PATENT DOCUMENTS

JP   2006-236554   7/2006

OTHER PUBLICATIONS

European Search Report dated Jul. 5, 2007, 2 pages.

* cited by examiner

*Primary Examiner* — Craig A. Renner
*Assistant Examiner* — Tamara Ashford
(74) *Attorney, Agent, or Firm* — Pillsbury Winthrop Shaw Pittman, LLP

(57) ABSTRACT

In one arrangement, apparatus for attaching a disk to a spindle of a spinstand has a spindle adapter. The spindle adapter has a drawbar movably disposed within. The drawbar has a connector end that is reversibly connectable to the cap and has a piston that is connectable to a source of fluid pressure. The drawbar is movable in response to fluid pressure so as to urge together the cap and the spindle adapter when connected. The cap and the spindle adapter are capable of holding a disk therebetween. In another arrangement, a movable stage movable over a deck of a spinstand has a lift stage arranged to hold a cap with a disk positioned thereon. The lift stage has at least one actuator for raising the lift stage so that the cap can be connected with a spindle adapter of an inverted spindle of a spinstand.

22 Claims, 7 Drawing Sheets

APPARATUS FOR ATTACHING A DISK TO A SPINDLE OF A SPINSTAND, METHODS FOR ATTACHING AND DETACHING A DISK TO AND FROM A SPINDLE OF A SPINSTAND AND A MOVABLE STAGE

TECHNICAL FIELD

The present invention relates to apparatus for attaching a disk to a spindle of a spinstand, methods for attaching and detaching a disk to and from a spindle of a spinstand, and a movable stage.

BACKGROUND

It is well known to use a spinstand to test various components of a hard disk assembly, such as in particular the read/write heads and the disk media. Such tests can be carried out in a manufacturing production environment, where typically every head and a proportion of disks are tested prior to being assembled into a hard disk assembly to ensure that they perform to the required standard. Testing using a spinstand can also be carried out in a research and development setting.

A spinstand typically comprises a deck, for example of granite, which is generally isolated from external sources of vibration in some way to avoid these affecting the accuracy of the test results. A spindle is attached to the deck for holding and rotating the disk. This will typically be an air bearing spindle with an integrated DC brushless motor. The spinstand has a puck for receiving the read/write head. The puck is positionable so as to move the head to a desired location under the surface of the disk. The puck will typically be positionable by a highly accurate x-y positional stage, having air bearings and linear encoders. It may also be possible to lock the puck down to the granite by application of a vacuum in order to prevent movement of the puck when in a desired position. The puck generally has some arrangement for loading/unloading the head to/from the test surface of the disk, such that the head can read and/or write a track of test data from the test surface of the disk. The puck also generally has some arrangement, such as a nanopositioner, for making very fine positional changes of the head relative to the test track.

When testing disks with a spinstand, particularly in a manufacturing environment, it is desirable to be able to swap the disk under test for a new disk as quickly and dependably as possible. It is also desirable to accelerate and decelerate the disk under test as fast as possible in order to increase throughput of disks tested. High accuracy in positioning the disk is also required. However prior art arrangements for attaching the disk to the spindle present many disadvantages in achieving these aims.

Another important consideration in attaching the disk to the spindle is accurately and dependably setting the so-called z-height of the test surface of the disk, i.e. the vertical height of the test surface relative to a datum or reference position. This is because, when loading a read/write head to a disk, the head must be vertically positioned with great accuracy relative to the test surface of the disk and so it is important that the z-height of the test surface is closely controlled when loading the disk to the apparatus. The maximum variation in the vertical positioning of the head relative to the head surface that is acceptable for the operation of the system is known as the "z-height budget".

SUMMARY

According to a first aspect of the present invention, there is provided apparatus for attaching a disk to a spindle of a spinstand, the apparatus comprising: a spindle adapter for attaching to a spindle; and, a cap; the spindle adapter having a drawbar movably disposed within, the drawbar having a connector end that is reversibly connectable to the cap and having a piston that is connectable to a source of fluid pressure, the drawbar being movable in response to fluid pressure applied to the piston so as to urge together the cap and the spindle adapter when connected, wherein the cap and the spindle adapter are arranged to be capable of holding a said disk therebetween.

One embodiment provides a way of attaching a disk to a spindle that addresses the above mentioned problems, and is particularly suited for an inverted spindle and for a manufacturing testing environment where it is desired to swap the disk media being tested as quickly as possible. This arrangement allows the cap to be securely attached to the spindle adapter without the use of bolts, which have a number of disadvantages, and without the use of tools for tightening such bolts. This is particularly advantageous in a spinstand having an inverted spindle, where there is typically poor access for such tools. (An inverted spindle is a spindle that is mounted in an inverted position, i.e. the end of the spindle to which the disk is mounted is positioned below the body of the spindle.)

The spindle adapter may have a mating surface for registering with a mating surface of the cap when connected and urged together. This allows a secure connection between the cap and the spindle adapter.

The cap may have a datum surface for registering with a portion of a surface of a said disk. When used with an inverted spindle, this arrangement is advantageous in that it allows the bottom surface of the disk, which in this case is the test surface of the disk, to register against a known datum. This known datum is provided since the disk test surface is registered against a datum surface of the cap and the cap is registered against a mating surface of the spindle adapter, which spindle adapter provides a known reference since it is connected to the spindle and thus effectively to the deck itself. This allows the underside of the disk to be tested in an inverted spindle spinstand without the tolerance of the disk thickness affecting the z-height of the head relative to the disk test surface.

In an embodiment, the spindle assembly comprises a second piston connectable to a source of fluid pressure, the second piston being arranged to clamp a said disk to the datum surface of the cap in response to the fluid pressure. This allows the disk to be securely reference against the datum surface of the cap. Furthermore, the pressure of the fluid pressure supply can be controlled, thereby controlling the clamp force acting on the disk. This allows a higher clamp force to be used when accelerating the disk and a lower clamp force when the disk has reached the desired test speed, so that the disk is less likely to suffer from distortion due to excessive clamp force. The clamp force can also be tailored to the disk under test, and particularly to disks having a variation in their thickness. Furthermore, the clamp force can be lowered to allow the disk to be centred when mounted on the spinstand. Also, the clamp force can be completely removed to aid disconnection of the cap from the spindle adapter and hence removal of the disk from the apparatus.

In an embodiment, the connector end of the drawbar comprises a latching assembly for reversibly connecting to the cap. The latching assembly may comprise a button that is depressible to release the latch. This allows simple connection and disconnection of the cap to and from the spindle assembly, and thereby connection and disconnection of the disk to the apparatus, without the need for tools. This arrangement is also simple for the operator to load/unload the disk where an inverted spindle is used and access to the disk is limited. This arrangement also lends itself to automation of the disk load and unload process.

In an embodiment, the latch button has a camming surface for engaging with at least one ball bearing of the latching assembly, the latch button being biased to cam the at least one ball bearing to a locking position in which the at least one ball bearing bears against an edge of the cap to hold the cap on the drawbar. In an embodiment, the latch button is depressible to allow the at least one ball bearing to move away from its locking position so as to allow the cap to disconnect from the drawbar.

In an embodiment, the cap has three conical pins arranged to centre a said disk when placed thereon. This allows the disk to be centred when place on the cap.

In an embodiment the apparatus is combined with a spindle, the spindle having an inverted configuration.

According to a second aspect of the present invention, there is provided a method of loading a disk to a spindle of a spinstand, the method comprising: placing the disk on a cap; applying fluid pressure to a piston of a drawbar of a spindle adapter connected to the spindle to move the drawbar to a connecting position; connecting the cap to the drawbar; and, applying fluid pressure to the piston of the drawbar to urge the cap and the spindle adapter together.

The step of disconnecting the cap to the drawbar may comprise: depressing a latch release button of a latch assembly of the drawbar; and, withdrawing the cap to unlatch from the latch assembly.

The step of connecting the cap to the drawbar may be performed by a disk exchanger, the disk exchanger being attached to or integrally formed with a movable stage for holding a head to be tested, the movable stage being movable to move a said head to be tested to a predetermined position relative to the disk when mounted to the spindle, the method comprising: moving the movable stage and disk exchanger to a first position where the disk exchanger is accessible to an operator; placing the disk on the cap; and, moving the movable stage and disk exchanger to a second position beneath the spindle, where the cap is connected to the drawbar of the spindle adapter.

According to a third aspect of the present invention, there is provided a method of unloading a disk from a spindle of a spinstand, the method comprising: applying fluid pressure to a piston of a drawbar of a spindle adapter connected to the spindle to move the drawbar to a disconnecting position; disconnecting a cap from the drawbar, the cap supporting the disk; and, removing the disk from the cap.

The step of disconnecting the cap to the drawbar may comprise: depressing a latch release button of a latch assembly of the drawbar; and, withdrawing the cap to unlatch from the latch assembly.

The step of disconnecting the cap from the drawbar may be performed by a disk exchanger, the disk exchanger being attached to or integrally formed with a movable stage for holding a head to be tested, the movable stage being movable to move a said head to be tested to a predetermined position relative to the disk when mounted to the spindle, the method comprising: moving the movable stage and disk exchanger to a first position beneath the spindle, where the cap is disconnected from the drawbar of the spindle adapter; moving the movable stage and disk exchanger to a second position where the disk exchanger is accessible to an operator; and, removing the disk from the cap.

According to a fourth aspect of the present invention, there is provided a movable stage movable over a deck of a spinstand for exchanging a disk in a said spinstand, the movable stage comprising a lift stage arranged to hold a cap with a said disk positioned thereon, the lift stage having at least one actuator for raising the lift stage so that the cap can be connected with a spindle adapter of an inverted spindle of a spinstand.

This arrangement has the advantage of using the x-y positioner that is present in most spinstands for moving the heads to also move the disk exchanger. This allows the disk loading mechanism to be moved between a load position under the spindle for the automation to load the disk to and unload the disk from the spindle, and a receiver position where the operator can access the lift stage more easily so as to be able to remove and replace a disk from the apparatus. Using the x-y positioner of the movable stage has the advantage that this positioner is usually highly accurate and already present on the spinstand. Thus high precision movement of the disk exchanger can be attained with minimal additional parts being required and thus minimal expense.

The apparatus may comprise a cap receiver for receiving a said cap on the lift stage and a gripper assembly arranged to releasably hold a said cap in the cap receiver. This allows the cap to be securely held in place on the lift stage until the cap has been connected to a spindle, at which point the cap can be released. This arrangement can also aid in removing the cap from a spindle.

The apparatus may comprise an actuator for pressing a latch release button on a said spindle adapter to disconnect a said cap from a said spindle adapter.

The movable stage may have a head-receiving portion for receiving a read/write head. This allows dual use of the movable stage in both positioning the head to the disk and other locations, and positioning the disk exchange apparatus. Thus the need to have two expensive positioning stages is avoided.

The movable stage in an embodiment is a puck that is mounted on an air bearing for movement over a deck.

BRIEF DESCRIPTION OF DRAWINGS

Embodiments of the present invention will now be described by way of example with reference to the accompanying drawings, in which.

DETAILED DESCRIPTION

Figure 1:
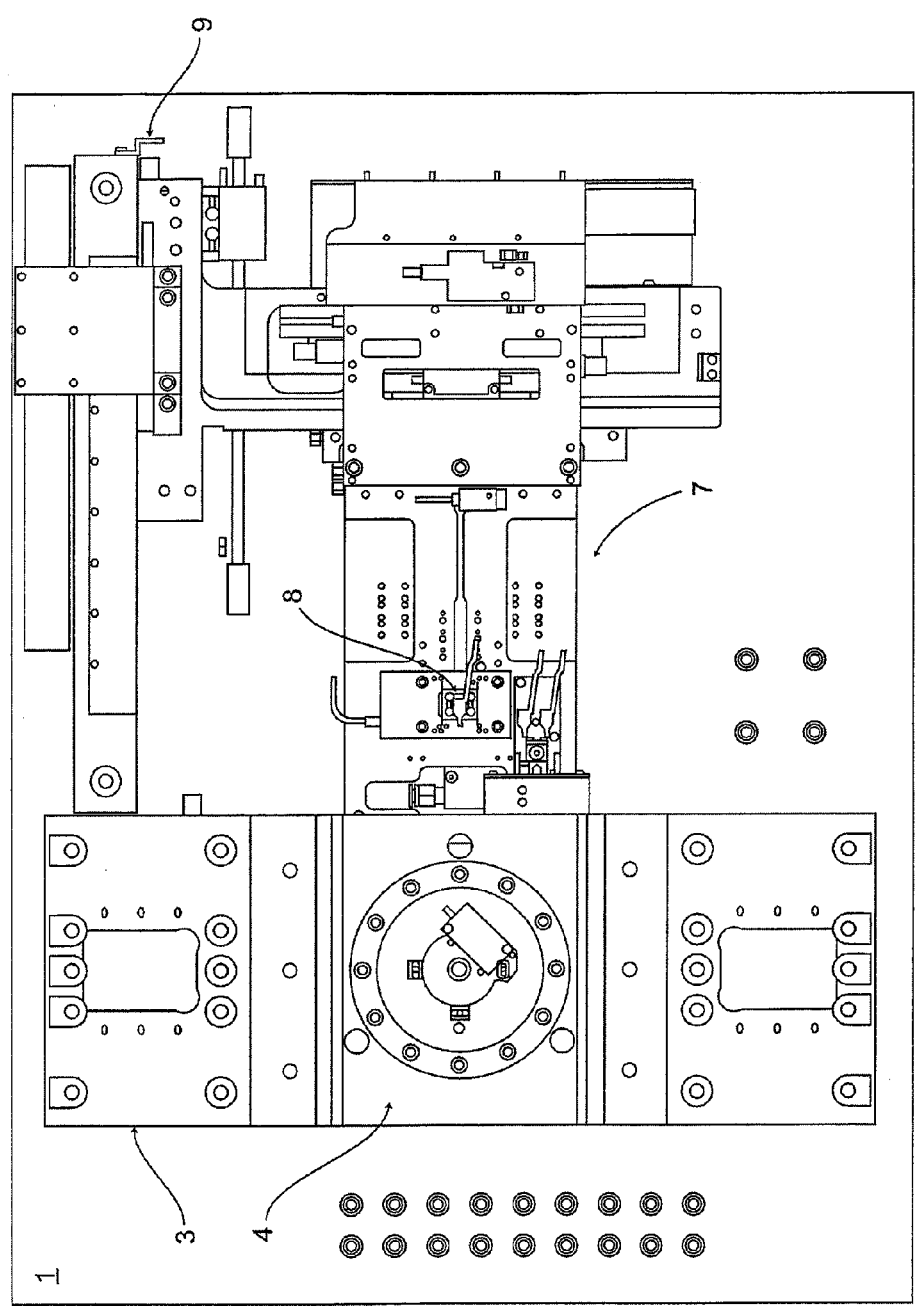
FIG. 1 shows a plan view of an example of a spinstand in accordance with an embodiment of the present invention.
Figure 2:
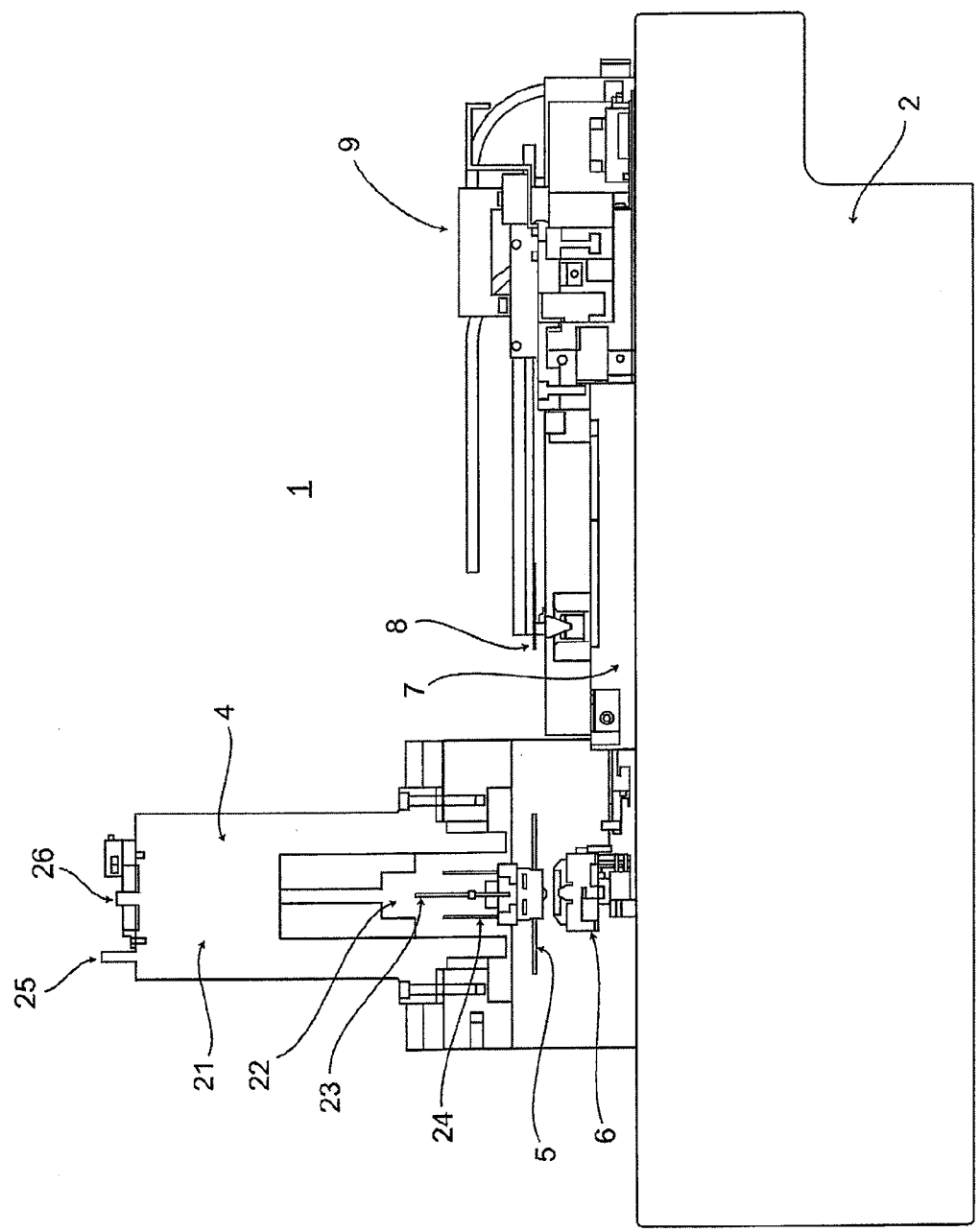
FIG. 2 shows a partially sectioned side view of the apparatus of FIG. 1.

Referring to FIGS. 1 and 2, a spinstand 1 comprises a deck 2. The deck 2 may be made from granite and may be mounted on isolation mounts (not shown) to isolate the spinstand 1 from external vibrations.

The spinstand 1 has a bridge 3 mounted to the deck 2. The bridge 3 supports a spindle assembly 4 for holding a disk 5 to be tested in an inverted configuration, i.e. such that the end of the spindle assembly 4 to which the disk 5 is fixed is lowermost. As can best be seen in FIG. 2, the spinstand 1 also has a disk exchanger 6. The spindle assembly 4 and the disk exchanger 6 will be described further below.

The deck 2 also has a movable stage for holding a read/write head 8 to be tested. The read/write head 8 is incorporated in a head gimbal assembly (HGA). In one embodiment as shown in the drawings, the movable stage includes or is a puck 7 for holding the head 8 that is supported on the surface of the deck 2, and is movable by a highly accurate x-y positional stage 9. The puck 7 is positionable by the x-y positional stage 9, for example being supported on air bearings (not shown) and having linear encoders (not shown) to allow its position to be accurately determined. The puck 7 is positionable so as to move the head 8 to a desired location under the surface of the disk 5 when the disk 5 is mounted on the spindle assembly 4. It may also be possible to lock down the puck 7 and/or the elements of the x-y positional stage 9 to the granite deck 2 by application of a vacuum in order to prevent movement of the puck 7 when in a desired position. Other arrangements of the movable stage are possible. For example, the head 8 may be held on and supported by the x-y positional stage 9, rather than being held on and supported by a puck 7 that is in turn supported by the deck 2 and positioned by the x-y positional stage 9.

As is conventional in the art, the terms x and y directions as used herein refer to orthogonal directions parallel to the surface of the deck 2 and disk 5 (i.e. the horizontal), whereas the term z-direction refers to the direction perpendicular to the deck 2 and parallel to the spindle 4 (i.e. the vertical). The terms downward or lowered are used to refer to moving perpendicularly toward the deck 2, whereas the terms upward or raised are used to refer to moving perpendicularly away from the deck 2. The terms axial and radial are to be taken to be relative to the spindle shaft 22 of the spindle assembly 4 unless the context demands otherwise.

The puck 7 also has an arrangement for loading the head 8 to the test surface of the disk 5, such that the head 8 can read from and/or write to a track of test data on the test surface of the disk 5. The puck 7 also has an arrangement, such as a nanopositioner on which the head 8 is mounted, for making very fine positional changes of the head 8 relative to the test track.

Thus the spinstand 1 allows a head 8 to be loaded to the disk 5 and very fine positioning of the head 8 across the test surface of the disk 5 whilst test data is written to and read from the disk 5. The test data can then be analysed as appropriate to the test being conducted.

FIG. 2 shows a sectional view of the spindle assembly 4. The spindle assembly 4 comprises an air bearing spindle having a fixed outer part 21 for attachment to the bridge 3, and a rotatable spindle shaft 22 to which the disk 5 is attached in use. The spindle assembly 4 is "inverted" in that it is mounted so that the end of the spindle shaft 22 to which attachment is made extends below the body of the spindle assembly 4. The spindle assembly 4 has an integral DC brushless motor (not shown) for rotating the spindle shaft 22. The spindle assembly 4 also has a plurality of ports 23,24 running axially therethrough, one port 23 being central and the other ports 24 being circumferentially spaced at a given outer radial position. These ports 23,24 allow fluid communication through the rotating part of the spindle 22 of for example a vacuum (negative air pressure) or positive air pressure. Inlets 25,26 in the top of the spindle assembly 4 allow fluid communication with the respective ports 23,24.

Figure 3:
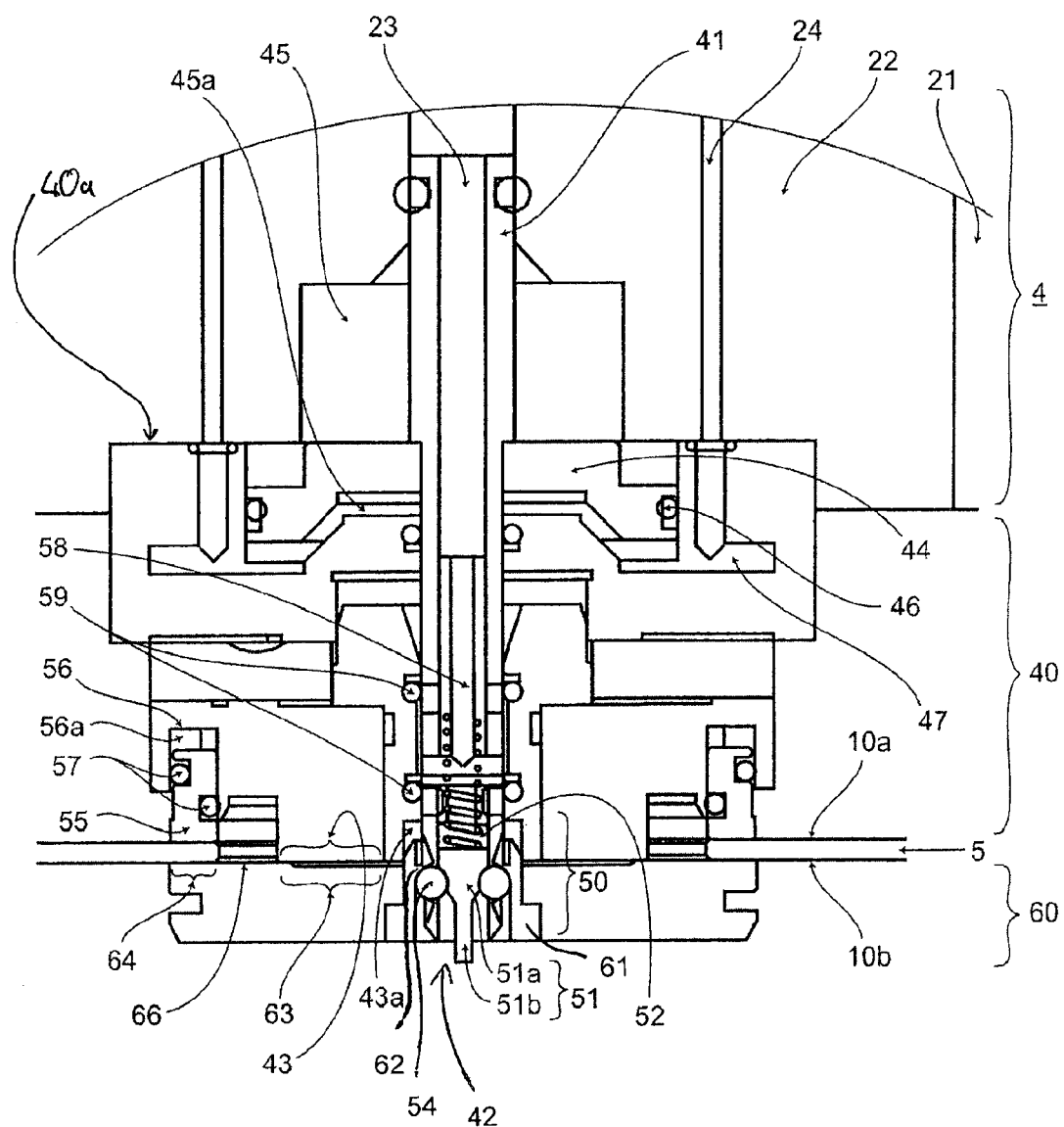
FIG. 3 shows a more detailed view of the spindle, spindle adapter and cap of FIG. 1.

Referring to FIG. 3, a spindle adapter 40 (also known as a media adapter) is connected to the spindle shaft 22. The spindle adaptor 40 has an attachment portion 40a which is attached to the spindle 22. A cap 60 is releasably connectable to the spindle adapter 40. The disk 5 is held between the spindle adapter 40 and the cap 60 as will be described in the following.

The spindle adapter 40 has a cavity 45 in which a drawbar 41 is movably disposed. The drawbar 41 has generally an extended cylindrical shape, the axis of which is co-linear with the rotational axis of the spindle adapter 40 and spindle shaft 22. The end portion 42 of the drawbar 41 extends beyond the bottom surface 43 of the spindle adapter 40. The drawbar 41 also has a piston 44 in the form of a radially extending flange along the body of the drawbar 41 attached to it or integrally formed with it.

The drawbar piston 44 has a pressure chamber 45a beneath it. O-ring seals 46 seal the pressure chamber 45a to the drawbar 41 and piston 44. The pressure chamber 45a is in fluid communication with ports 47 in the spindle adapter 40. When the spindle adapter 40 is connected to the spindle shaft 22, these ports 47 are aligned with and in fluid communication with the outer ports 24 in the spindle shaft 22. Thus fluid pressure can be supplied to inlet 26 of the spindle 4, via ports 24,47 to the pressure chamber 45a and thereby to the piston 44. Thus by applying positive fluid pressure, such as pneumatic pressure to inlet 24, the piston 44 and drawbar 41 are forced upwards, and by applying negative fluid pressure (i.e. a vacuum) to inlet 24, the piston and drawbar 41 assembly are forced downwards.

The end portion 42 of the drawbar 41 incorporates a ball-latch connector 50 for connecting the cap 60 to the drawbar 41. The connector 50 comprises a plurality of ball bearings 54 housed in the drawbar 41. The ball bearings 54 are arranged such that they can move between a radially extended position where they project beyond the sides of the drawbar 41 through holes in the wall of the drawbar 41, and a radially retracted position where they retract into the body of the drawbar 41 so as not to project from the drawbar 41.

The connector 50 also comprises a latch release button 51 which is disposed in a recess in the end of the end portion 42 of the drawbar 41. The button 51 is biased axially downward by a spring 52. The button 51 has an upper conical portion 51a, and a lower shaft portion 51b of reduced diameter. When the latch release button 51 is in its lowermost position, the conical portion 51a cams the ball bearings 54 to their extended position. When the latch release button 51 is depressed against the action of the biasing spring 52 by pressing on the shaft portion 51b, the ball bearings 54 can fall inward to their retracted position within the drawbar 41.

The cap 60 has a hollow collet 61 at its centre. The interior of the collet 61 has a smaller diameter portion at one end forming a detent edge 62 or shoulder.

In order to connect the cap 60 to the spindle adapter 40, the latch release button 51 is first depressed so that the ball bearings 54 fall inward to their retracted position. The drawbar 41 is in its relaxed position during this process. Next, the cap 60 with a disk supported thereon is offered up to the spindle adapter 40, with the connector part 50 of the drawbar 41 being accepted into the hollow collet 61. The cap 60 is advanced until a mating surface 63 of the cap 60 registers or abuts with a mating surface 43 of the spindle adapter 40, whereupon the cap 60 is fully advanced. This mating of surfaces 43,63 takes place through the centre hole in the disk 5. At this position, the upwardly facing end of the collet 61 engages with a cooperating recess 43a in the mating surface 43 of the spindle adapter 40 so as to keep the cap 60 centred on the spindle adapter 40. Also at this position, the ball bearings 54 below the detent edge 62 of the collet 61. The latch release button 51 is then released so that the ball bearings 54 are cammed outward to their extended position by the conical portion 51*a*. At this point, the ball bearings 54 prevent the cap 60 from detaching from the drawbar 41, thus holding the cap 60 in position on the drawbar 41.

Once the cap 60 is connected to the drawbar 41 in this way, fluid pressure is applied to the inlet 26 of the spindle assembly 4 in order to draw up the drawbar 41. This has the effect of first engaging and then urging the ball bearings 54 against the detent edge 62 of the collet 61 and then in turn, engaging and urging the mating surface 63 of the cap 60 against the mating surface 43 of the spindle adapter 40. Once all of the play between components has been taken up, this provides a tightly registered connection between the cap 60 and spindle adapter 40.

In order to release the cap 60 from the spindle adapter, the fluid pressure to the inlet 26 is removed. The latch release button 51 is then depressed to allow the ball bearings 54 to move inward to their retracted position and the cap 60 is allowed to separate from the spindle adapter 40.

Thus this arrangement allows the cap 60 to be easily and quickly secured to and released from the spindle adapter 40 without using bolts or tools and the disadvantages associated therewith.

In spinstands in general, the read/write head is usually tested in an inverted position, i.e. the head is held so as to be pointing upwards. This means that it is the bottom surface of the disk under test that is written to and read from by the head. This makes controlling the z-height of the test surface of the disk relatively straightforward when a non-inverted spindle configuration is used. The bottom surface of the disk is clamped against the spindle (via the spindle adapter), which provides the known z-height reference or datum. Thus the bottom surface, i.e. the test surface, is directly referenced against the datum.

However, controlling the z-height is more challenging in an inverted spindle configuration. This is because in this configuration it is the top surface 10*a* of the disk 5 that is connected against the spindle 4, the spindle 4 giving the known reference point or datum in the z-direction. However, it is the bottom surface 10*b* of the disk 5 that is tested, i.e. the opposite surface to the one referenced against the datum. This creates a problem in that the tolerance in the thickness of the successive disks 5 being tested greatly affects the z-height of the test surface 10*b* of the disk 5 under test. In fact, currently the tolerance in disk thicknesses is several times the acceptable z-height budget.

To address this potential problem, the spindle adapter 40 is provided with an annular piston 55 being movable in a recess 56 within the spindle adapter 40. The piston 55 is sealed with the walls of the recess 56 by O-rings 57 thereby creating a pressure chamber 56*a* behind the piston 55. The pressure chamber 56*a* is in fluid communication with a port 58 running through the centre of the drawbar 41 and exiting through the side wall of the drawbar 41. The port 58 in the body of the drawbar 40 is in fluid communication with the central port 23 of the spindle shaft 22 which in turn is in fluid communication with the inlet 25 in the spindle assembly 4. O-rings 59 are used to seal the port 58 to the pressure chamber 56*a*. Thus, by supplying positive fluid pressure to the inlet 25, fluid pressure is applied via the ports 23,58 to pressure chamber 56*a*. This pressure causes the piston 55 to be lowered to engage the top surface of the disk 5 close to its inner diameter and to urge or clamp the disk 5 against a datum surface 64 of the cap 60. In this example the datum surface 64 is the same as the mating surface 63 of the cap 60.

Thus the test surface (i.e. the lowermost surface) of the disk 5 is made to register against the top surface 63,64 of the cap 60, which in turn is made to register against the spindle adapter 40. In effect then, the test surface of the disk 5 is made to register against the spindle adapter 40 (via the cap 60), which spindle adapter 40 provides a known z-height datum. Thus, the tolerance of the thickness of the disk 5 is removed in determining the z-height of the test surface of the disk 5 relative to the head 7.

Another advantage of this clamping arrangement is that the clamping force delivered to the disk 5 is independent of the thickness of the disk 5. Thus, the tolerance of the thickness of the disk 5 does not affect the clamping force. Also, this allows the same spindle adapter 40 to be used for different classes of disk 5.

Another advantage of this clamping arrangement is that, by varying the fluid pressure supplied to piston 55, the clamping force applied to the disk 5 between the piston 55 of the spindle adapter 40 and the datum surface 64 of the cap 60 can be controlled as required. Again, the clamping force achieved is independent of the thickness of the disk 5. In all cases, whatever the clamping force applied, the test surface 10*b* of the disk 5 will be registered against the datum surface 64 of the cap 60.

This allows a testing technique where greater clamping force can be applied to the disk 5 during acceleration of the disk 5 to test speed. This helps prevent slippage of the disk 5 in the adapter 40 due to the high torques required during acceleration. This in turn prevents the damage to the disk 5 that typically occurs when the disk 5 slips. Examples of minimum clamping pressures/axial loads for various disk accelerations are as follows:

12 krpm/s—26 N axial load or 1.4 Bar (approx. 145 kPa) clamp pressure 15 krpm/s—33 N axial load or 1.8 Bar (approx. 185 kPa) clamp pressure 18 krpm/s—44 N axial load or 2.3 Bar (approx. 235 kPa) clamp pressure.

Once the disk 5 has reached the desired rotational speed for testing, less torque is required and the clamping force can accordingly be reduced whilst testing is carried out. This minimises the possibility of disk 5 distortion due to a high clamping force. This is desirable, since disk distortion will negatively affect the accuracy of the test results. Also, in a disk test apparatus 1 the disk 5 under test will be ultimately intended for incorporation into a head disk assembly and so distortion to the disk 5 is highly undesirable.

This arrangement of the clamping piston 55 also allows the disk 5 to be centred even when mounted to the spindle 4. To do this, the clamping force is reduced still further, to nothing or substantially nothing, and the disk 5 is centred in the adapter 40, for example by tapping an edge of the disk 5. Thus for example the disk 5 can be centred relative to the spindle 4 without having to remove the spindle adapter 40 from the apparatus 1, or without having to apply any tools for loosening bolts etc.

Figure 4:
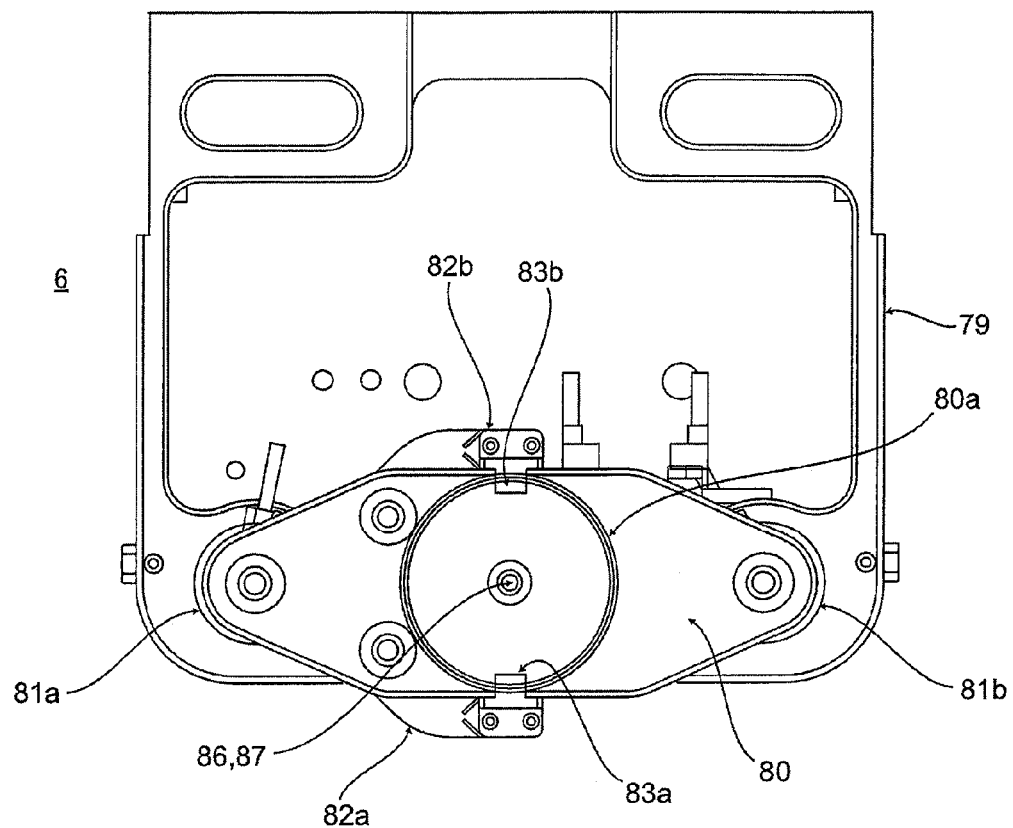
FIG. 4 shows a plan view of the disk exchanger of FIG. 1.
Figure 5:
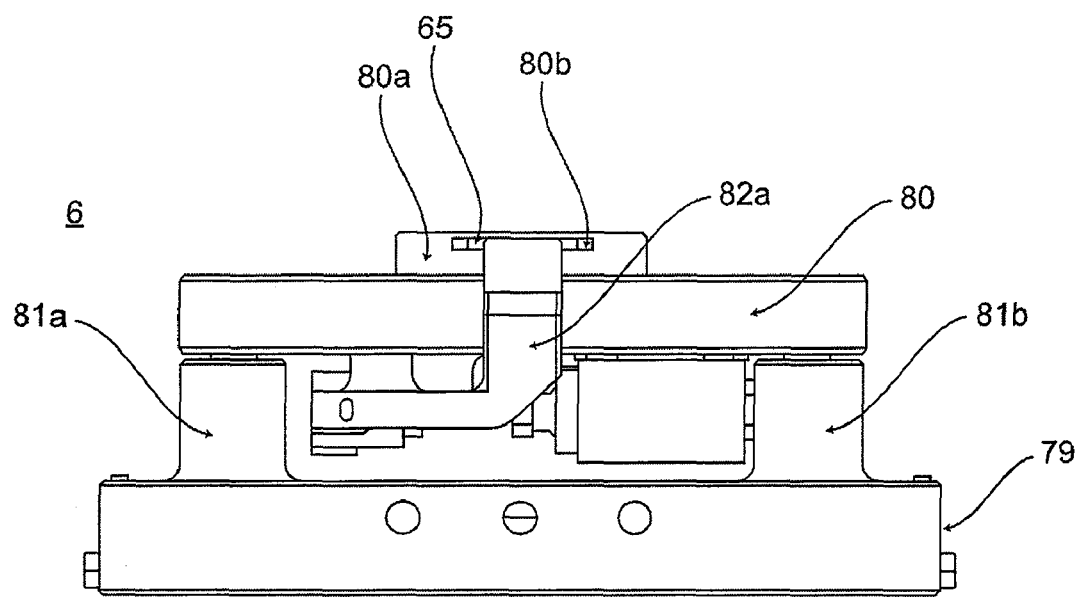
FIG. 5 shows a side view of the disk exchanger of FIG. 1.
Figure 6:
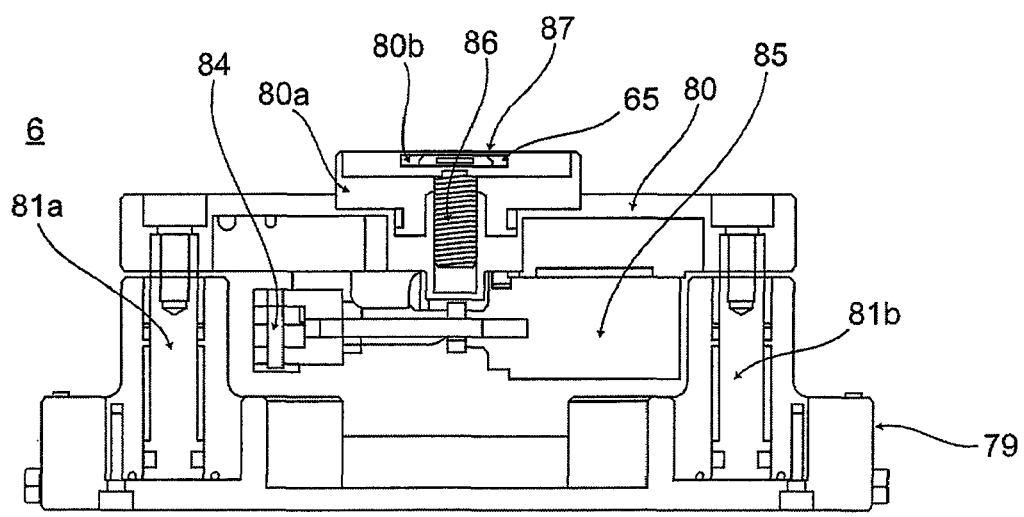
FIG. 6 shows a sectioned side view of the disk exchanger of FIG. 1; and, FIG. 7 shows the disk exchanger of FIG. 1 with a disk in place.

Turning to FIGS. 4, 5 and 6, detailed views of the automated disk exchanger 6 are shown. The disk exchanger 6 comprises a base 79 and a lift stage 80. The lift stage 80 has a cap receiver 80*a* positioned on its uppermost surface for receiving a cap 60. The base 79 has two pneumatic lifters 81*a*,81*b* by which the lift stage 80 can be raised. The disk exchanger 6 also has two gripper arms 82*a*,82*b* which are attached to the lift stage 80 and thus are also raised by the lifters 81*a*,81*b* with the lift stage 80.

The ends of the gripper arms 82*a*,82*b* extend adjacent the cap receiver 80*a* on opposite sides. The gripper arms 82*a*,82*b* have inwardly protruding blades 83*a*,83*b* at their ends. The gripper arms 82*a*,82*b* are pivotably mounted to the lift stage 80 by a pivot 84 and can be actuated to pivot inwards by an actuator 85. When actuated inwards, the protruding blades 83a,83b pass through respective holes 80b in the sides of the cap receiver 80a and, when a cap 60 is in the cap receiver 80a, engage with respective recesses 65 in the sides of the cap 60. In this position, the gripper blades 83a,83b securely hold the cap 60 in place within the cap receiver 80a. To release the cap 60 so that it can be removed from the cap receiver 80a, the gripper arms 82a,82b are actuated outwards so as to withdraw the gripper blades 83a,83b from the recesses 65 in the sides of the cap 60.

Figure 7:
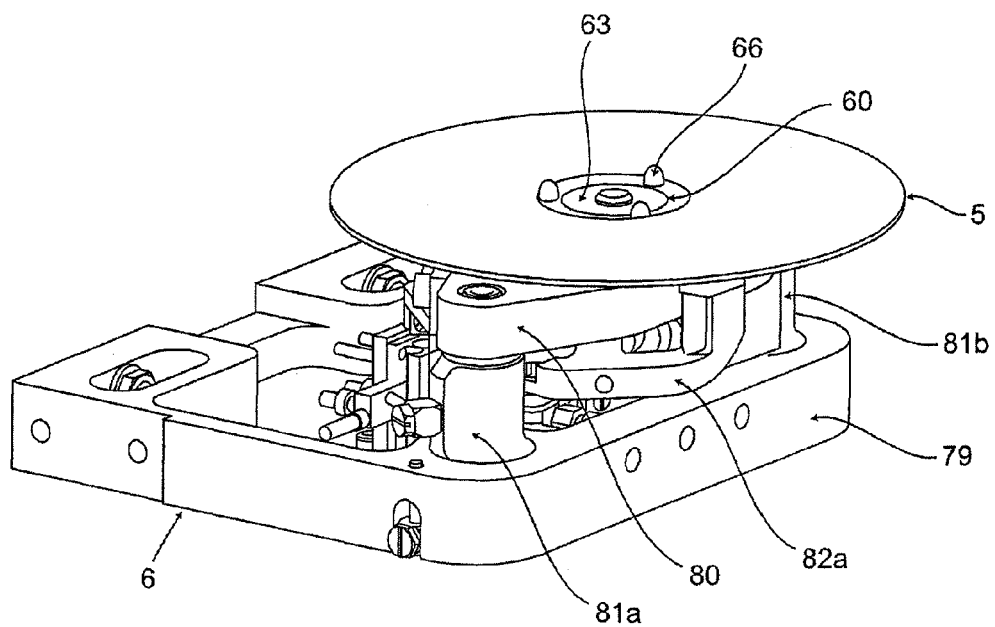

As can best be seen in FIG. 7, the cap 60 has three cylindrical pins 66 projecting upward from its datum surface 64. These pins 66 are spaced so that they pass through the centre of the disk 5 when the disk 5 is placed on the cap 60, thereby centering the disk 5 on the cap 60 and retaining the disk 5 on the cap 60 when the disk exchanger 6 is being moved around as will be discussed below. FIG. 7 shows the disk 5 in position on the cap 60.

As can also be seen from FIG. 7, the disk exchanger 6 of this embodiment is connected to the puck 7. Thus, the x-y positioner 9 of the puck 7 can be used to move the disk exchanger 6. The disk exchanger 6 may be moved on an air bearing if desired and/or may be capable of being locked down to the deck 2. The disk exchanger 6 can be moved by the x-y positioner 9 from a load position underneath the spindle assembly 4 to a receiving position away from the bridge 3, where the lift stage 80 is more easily accessible by an operator for removing the disk 5 from the cap 60 and placing a new untested disk 5 in its place.

When the disk exchanger 6 is in position below the spindle adapter 40, by actuating the pneumatic lifters 81a,81b to raise the lift stage 80, the cap 60 and disk 5 are offered up to the spindle adapter 40 so that connection can be made between them. The lift stage 80 has a further actuator 86 (shown in FIG. 6) arranged to depress the latch release button 51 of the spindle adapter ball-latch connector 50 by pressing on the shaft portion 51b of the latch release button 51 which protrudes beneath the cap receiver 80a through a hole in the centre of the cap receiver 80a.

Optionally the spinstand may have a disk flutter control device (DFCD) (not shown). The DFCD is a flat block of material of for example stainless steel or nickel-plated aluminum alloy which is positioned very close to the upper surface 10a of the disk 5 during testing, and helps to reduce vibrations of the disk 5 when it is spun. The DFCD can be raised and lowered by a pneumatic device (not shown).

Thus the following sequence of actions takes place for loading a disk to the spindle, some of which may be simultaneous or in a slightly different order:
1. A disk 5 is placed on the cap 60 on the disk exchanger 6 and the puck 7 is moved by its x-y positioner 9 so that the cap 60 is under the spindle adapter 40.
2. The DFCD is raised. This ensures that if the disk 5 has not been placed flat on the cap 60 and is sloping somewhat it will not contact the DFCD when the disk 5 is raised by the lift stage 80.
3. The drawbar 41 is lowered and the lift stage 80 of the disk exchanger 6 is raised.
4. The connector assembly 50 of the drawbar 41 enters the collet 61, and the latch button 51 is pressed upwards by the actuator 86 in the lift stage 80. The ball bearings 54 of the connector assembly 50 fall inwards so that the ball bearings 54 can pass the detent edge 62 in the collet 61.
5. The latch button 51 is released and is urged downwards by the biasing spring 52 so that the ball bearings 54 of the connector 50 engage with the detent edge 62.
6. The gripper arms 82a,b are pivotted outwards to release the cap 60.
7. The drawbar 41 is raised by pneumatic pressure on the piston 44, which urges the cap 60 and the spindle adapter 40 together.
8. The DFCD is lowered.
9. The lift stage 80 is lowered.
10. High positive pressure is applied via piston 55 to clamp the disk 5 between the piston 55 and the datum surface 64 of the cap 60 so that no slipping occurs due to the high acceleration torque applied to the disk 5.
11. The spindle motor starts and brings the disk 5 up to speed.
12. The clamping pressure is reduced to the level appropriate for testing.
13. The puck 7 is moved so that the head 8 is under the correct track of the disk 5, and testing can take place.

To remove a disk 5 from the spindle adapter 40 the following sequence of actions takes place, some of which may be simultaneous or in a slightly different order. (It is assumed that that the spindle shaft 22 has stopped rotating, or that it stops during the first action.)
1. The puck 7 is moved by its x-y positioner 9 so that the disk exchanger 6 is under the spindle adapter 40.
2. The DFCD is raised.
3. The disk clamping pressure is removed.
4. The drawbar 41 is lowered and the lift stage 80 is raised.
5. The gripper arms 82a,82b engage with the cap 60.
6. The latch button 51 is pressed upwards by the actuator 86 in the lift stage 80. The ball bearings 54 of the connector 50 fall inwards so that the end of the drawbar 42 can be withdrawn past the shoulder 62 of the cap 60.
7. The lift stage 80 is lowered, carrying the cap 60 and disk 5 with it.
8. The puck 7 is moved by its x-y positioner 9 to place the disk exchanger 6 at the receiving station.

Thus by supplying appropriate control signals to the various actuators and sources of fluid pressure hereinbefore described, for example co-ordinated by a computer or microcontroller, the exchange of disks 5 on the spindle 4 can be performed automatically except for an operator having to remove a tested disk 5 from the disk exchanger 6 and place a new disk 5 in its place when the disk exchanger 6 is in the receiver position.

Embodiments of the present invention have been described with particular reference to the example illustrated. However, it will be appreciated that variations and modifications may be made to the examples described within the scope of the present invention. For example, the invention is not limited to the specific spindle types or arrangements, or puck positioning devices specifically described in the description.

The invention claimed is:
1. Apparatus for attaching a disk to a spindle of a spinstand, the apparatus comprising:
a spindle adapter for attaching to a spindle; and,
a cap;
the spindle adapter comprising an attachment portion for attaching to the spindle, the spindle adaptor having a drawbar movably disposed within, the drawbar having a connector end that is reversibly connectable to the cap so that the cap can be separated from the spindle adapter to allow exchange of said disk, the drawbar having a piston that is connectable to a source of fluid pressure, the drawbar being movable in response to fluid pressure applied to the piston so as to urge together the cap and the spindle adapter when connected,
wherein the spindle adapter has a mating surface and when the cap and the spindle adaptor are connected and urged together, the mating surface of the spindle adapter registers with a mating surface of the cap without clamping the disk, wherein the mating surface of the spindle adaptor is fixed in position relative to the attachment portion of the spindle adaptor, and wherein the cap and the spindle adapter are arranged to be capable of holding said disk therebetween by the operation of a clamp mechanism that operates separately of movement of the drawbar.

2. Apparatus according to claim 1, wherein the cap has a datum surface for registering with a portion of a surface of said disk.

3. Apparatus according to claim 2, wherein the spindle adapter comprises a second piston connectable to a source of fluid pressure, the second piston being arranged to clamp said disk to the datum surface of the cap in response to the fluid pressure.

4. Apparatus according to claim 1, wherein the connector end of the drawbar comprises a latching assembly for reversibly connecting the cap to the drawbar.

5. Apparatus according to claim 4, wherein the latching assembly comprises a latch button that is depressible to release the cap.

6. Apparatus according to claim 5, wherein the latch button has a camming surface for engaging with at least one ball bearing of the latching assembly, the latch button being biased to cam the at least one ball bearing to a locking position in which the at least one ball bearing bears against an edge of the cap to hold the cap on the drawbar.

7. Apparatus according to claim 6, wherein the latch button is depressible to allow the at least one ball bearing to move away from its locking position so as to allow the cap to disconnect from the drawbar.

8. Apparatus according to claim 1, wherein the cap has three conical pins arranged to centre a said disk when placed thereon.

9. Apparatus according to claim 1 in combination with a spindle, the spindle having an inverted configuration.

10. Apparatus according to claim 9, comprising a movable stage movable over a deck of a spinstand for exchanging a disk in said spinstand, the movable stage comprising a lift stage arranged to hold the cap with said disk positioned thereon, the lift stage having at least one actuator for raising the lift stage so that the cap can be connected with the spindle adapter of the inverted spindle of the spinstand.

11. Apparatus according to claim 10, wherein the movable stage comprises a cap receiver for receiving the cap on the lift stage and a gripper assembly arranged to releasably hold the cap in the cap receiver.

12. Apparatus according to claim 10, wherein the movable stage comprises an actuator for pressing a latch release button on the spindle adapter to disconnect the cap from a said spindle adapter.

13. Apparatus according to claim 10, wherein the movable stage has a head-receiving portion for receiving a read/write head.

14. Apparatus according to claim 10, wherein the movable stage is a puck that is mounted on an air bearing for movement over a deck.

15. A method of attaching a disk to a spindle of a spinstand, the method comprising:

placing the disk on a cap;

applying fluid pressure to a piston of a drawbar of a spindle adapter connected to the spindle to move the drawbar to a connecting position;

connecting the cap to the drawbar, the drawbar having a connector end that is reversibly connectable to the cap;

applying fluid pressure to the piston of the drawbar to urge a mating surface of the cap and a mating surface of the spindle adapter together such that the cap registers with the spindle adapter without clamping the disk, wherein the spindle adaptor has an attachment portion for attaching to the spindle and the mating surface of the spindle adaptor is fixed in position relative to the attachment portion; and clamping the disk with a clamping mechanism that operates separately of movement of the drawbar.

16. A method according to claim 15, the step of connecting the cap to the drawbar comprising:

depressing a latch release button of a latch assembly of the drawbar; and, advancing the cap and releasing the latch release button to cause the cap to latch with the latch assembly.

17. A method according to claim 15, wherein the step of connecting the cap to the drawbar is performed by a disk exchanger, the disk exchanger being attached to or integrally formed with a movable stage for holding a head to be tested, the movable stage being movable to move a said head to be tested to a predetermined position relative to the disk when mounted to the spindle, the method comprising:

moving the movable stage and disk exchanger to a first position where the disk exchanger is accessible to an operator;

placing the disk on the cap; and, moving the movable stage and disk exchanger to a second position beneath the spindle, where the cap is connected to the drawbar of the spindle adapter.

18. A method according to claim 17, wherein the movable stage is a puck that is mounted on an air bearing for movement over a deck.

19. A method of detaching a disk from a spindle of a spinstand, wherein a spindle adapter is connected to the spindle, wherein the disk is held by a clamping mechanism between a cap and the spindle adapter, the cap having a mating surface being registered with the spindle adapter without clamping the disk, and wherein the spindle adaptor has an attachment portion for attaching to the spindle and the mating surface of the spindle adaptor is fixed in position relative to the attachment portion, the method comprising:

declamping the disk with the clamping mechanism;

applying fluid pressure to a piston of a drawbar of the spindle adapter to move the drawbar to a disconnecting position such that the cap which is connected to the drawbar deregisters with the spindle adapter, the cap supporting the disk, wherein the clamping mechanism operates separately of movement of the drawbar;

disconnecting the cap from the drawbar; and, removing the disk from the cap.

20. A method according to claim 19, the step of disconnecting the cap to the drawbar comprising:

depressing a latch release button of a latch assembly of the drawbar; and, withdrawing the cap to unlatch from the latch assembly.

21. A method according to claim 19, wherein the step of disconnecting the cap from the drawbar is performed by a disk exchanger, the disk exchanger being attached to or integrally formed with a movable stage for holding a head to be tested, the movable stage being movable to move a said head to be tested to a predetermined position relative to the disk when mounted to the spindle, the method comprising:

moving the movable stage and disk exchanger to a first position beneath the spindle, where the cap is disconnected from the drawbar of the spindle adapter;

moving the movable stage and disk exchanger to a second position where the disk exchanger is accessible to an operator; and, removing the disk from the cap.

22. A method according to claim 21, wherein the movable stage is a puck that is mounted on an air bearing for movement over a deck.

* * * * *